US005561290A

United States Patent [19]
Strobel et al.

[11] Patent Number: 5,561,290
[45] Date of Patent: Oct. 1, 1996

[54] OPTICAL DETECTOR CALIBRATOR SYSTEM

[75] Inventors: James P. Strobel, Bradenton; John S. Moerk, Titusville; Robert C. Youngquist, Cocoa, all of Fla.

[73] Assignee: The United States of America as represented by the Administrator of the National Aeronautics and Space Administration, Washington, D.C.

[21] Appl. No.: 488,523

[22] Filed: Jun. 9, 1995

[51] Int. Cl.⁶ .................................................. G01J 1/00
[52] U.S. Cl. ............................................. 250/252.1
[58] Field of Search ................................ 250/252.1 A

[56] References Cited

U.S. PATENT DOCUMENTS

| | | | |
|---|---|---|---|
| 1,965,947 | 7/1934 | Prouty . | |
| 2,613,313 | 10/1952 | Weeks | 250/504 R |
| 3,136,890 | 6/1964 | Wain | 250/504 R |
| 3,553,665 | 1/1971 | Trumble | 250/504 R |
| 3,609,364 | 9/1971 | Paine | 250/504 R |
| 3,659,043 | 4/1972 | Low et al. | 250/333 |
| 3,944,834 | 3/1976 | Chuan et al. | 250/372 |
| 4,112,335 | 9/1978 | Gonser | 315/241 R |
| 4,241,258 | 12/1980 | Cholin | 250/372 |
| 4,446,363 | 5/1984 | Lakin et al. | 250/203 R |
| 4,529,881 | 7/1985 | Ceurvels et al. | 250/353 |
| 4,864,146 | 9/1989 | Hodges et al. | 250/504 R |
| 4,896,042 | 1/1990 | Humphreys | 250/435 |
| 4,975,584 | 12/1990 | Benjamin et al. | 250/372 |
| 5,034,606 | 7/1991 | Ohkubo et al. | 250/252.1 A |
| 5,034,615 | 7/1991 | Rios et al. | 250/461.1 |
| 5,056,097 | 10/1991 | Meyers | 372/38 |

Primary Examiner—Davis L. Willis
Assistant Examiner—Kiet T. Nguyen
Attorney, Agent, or Firm—William J. Sheehan

[57] ABSTRACT

An optical detector calibrator system simulates a source of optical radiation to which a detector to be calibrated is responsive. A light source selected to emit radiation in a range of wavelengths corresponding to the spectral signature of the source is disposed within a housing containing a microprocessor for controlling the light source and other system elements. An adjustable iris and a multiple aperture filter wheel are provided for controlling the intensity of radiation emitted from the housing by the light source to adjust the simulated distance between the light source and the detector to be calibrated. The geared iris has an aperture whose size is adjustable by means of a first stepper motor controlled by the microprocessor. The multiple aperture filter wheel contains neutral density filters of different attenuation levels which are selectively positioned in the path of the emitted radiation by a second stepper motor that is also controlled by the microprocessor. An operator can select a number of detector tests including range, maximum and minimum sensitivity, and basic functionality. During the range test, the geared iris and filter wheel are repeatedly adjusted by the microprocessor as necessary to simulate an incrementally increasing simulated source distance. A light source calibration subsystem is incorporated in the system which insures that the intensity of the light source is maintained at a constant level over time.

24 Claims, 7 Drawing Sheets

OPTICAL DETECTOR CALIBRATOR SYSTEM

ORIGIN OF THE INVENTION

The invention described herein was made in the performance of work for the U.S. Government under a NASA contract, and is subject to the provisions of Public Law 96-517 (35 USC 202) in which the contractor has elected not to retain title.

BACKGROUND OF THE INVENTION

The present invention relates in general to a system for testing and calibrating optical detectors, such as for example, hydrogen fire detectors.

Hydrogen fires present a significant danger during rocket launch preparations at the Kennedy Space Center. These types of fires are particularly hazardous if they occur during daylight hours because hydrogen burns with a flame that is virtually invisible to the naked eye. As a result of this potential hazard, the Kennedy Space Center has installed groups of special detectors at each launch pad which can detect the presence of a hydrogen fire. These detectors are specifically shortwave ultraviolet (UV) detectors which utilize a Hamamatsu ultraviolet detector tube to indicate the presence of radiation in the optical wavelength range from 180 nm to 240 nm. This spectral window is unique for within it, a hydrogen fire emits a small amount of radiation, while incandescent lamps and the sun emit no significant radiation, and the air is transmissive. Consequently, this spectral region is very favorable for monitoring hydrogen fires in air with a minimum possibility of false alarms.

Each launch pad utilizes about 60 hydrogen fire detectors in one of three configurations referred to as (−1), (−2) and (−3). A (−2) unit has an unmodified configuration designed to alarm off of a standard hydrogen fire (defined as the fire produced by burning $H_2$ flowing at 5 SLPM through a $\frac{1}{16}$" orifice) at a distance of 24 feet. A (−1) unit is a (−2) unit with a screen mesh added to reduce sensitivity to the point where the unit will alarm off of a standard hydrogen fire at 15 feet. A (−3) unit has modified electronics added to increase the sensitivity such that it will alarm at a distance of 54 feet from a standard hydrogen fire.

Before the fire detectors are installed at the launch pad, they must be tested and calibrated to insure that they work properly. In the past, the calibration procedure has been performed in a laboratory by exposing the detectors to an actual hydrogen flame. However, recent hydrogen fire safety restrictions have prevented the calibration laboratory from being able to calibrate the detectors using an actual hydrogen flame. Also, the same restrictions prevent operations personnel from checking the performance of the units in the field, and have made it difficult for the NASA Sensors and Transducer Laboratory to do the same. Consequently, it has become almost impossible to determine whether a hydrogen fire detector meets specifications by performing tests on KSC property. This has created a need for a fire detector calibration and testing device which can accurately test the operation of a hydrogen fire detector without use of an actual hydrogen flame.

SUMMARY OF THE INVENTION

To meet the foregoing need, the subject invention has been developed which can accurately test the operation of all types of optical radiation responsive detectors, such as for example, hydrogen fire detectors. Through the provision of a system employing a special light source and optical filter arrangement, the subject invention can simulate a source of emitted radiation, such as for example a hydrogen fire, by emitting radiation in a spectral range that simulates the radiation source's spectral signature. In this manner, the need for employing the actual source of radiation (e.g., a hydrogen flame) to test the detector is eliminated.

The system of the subject invention is preferably microprocessor controlled, and includes a number of optical elements which are employed to control the intensity and wavelength range of the emitted radiation directed toward the optical detector under test. This permits simulation of a radiation source at different distances from the detector so that the sensitivity and range of the detector can be accurately measured. To do this, the microprocessor sequentially tests the detector at incrementally increasing simulated distances, and determines at what distance the detector no longer responds within a set period of time.

The optical elements employed to control the intensity of the emitted radiation include a geared camera iris and a filter wheel containing a plurality of neutral density filters. The iris is controlled by a stepper motor, and is the primary unit used to adjust the transmitted radiation intensity. The key purpose of the filter wheel is to provide coarse adjustments of the transmitted intensity that are necessary when the simulated distance is fairly short, and incremental changes in the simulated distance require substantial changes in the transmitted intensity. Another purpose of the filter wheel is to provide a means to limit the spectral content of the transmitted radiation. Each position of the filter wheel places a selected band pass filter, as well as a neutral density filter, in the path of the transmitted radiation. For fairly long simulated radiation source distances, a neutral density filter with a fairly high transmission attenuation factor is employed so that the iris can be opened up more fully to a position where fine adjustments are then possible.

The system also includes an automatic lamp calibration subsystem which insures that the intensity of the lamp radiation is maintained constant over time. This is important because lamps typically degrade over time, and the lamp current must therefore be increased to compensate for this degradation. Again, the microprocessor controls this function by changing the lamp current in response to the lamp's intensity which is sensed by a conventional optical detector. To insure that background noise and radiation do not affect this process, a chopper head assembly is preferably employed which enables the microprocessor to subtract the detector signal when it is exposed to the lamp from the detector signal when it is not exposed to the lamp, and then average these readings. This provides a stable measure of the lamp intensity and allows the microprocessor to modify the current in order to achieve a desired detector signal, and therefore desired lamp intensity. To some extent, variation of the lamp current is also employed by the system as a third means by which the transmitted intensity is controlled.

It is also important that the radiation transmitted by the system be in the form of a uniformally illuminated disk to insure consistent test results. The system employs two elements to achieve a uniform radiation pattern; a diffuse window and a diffuser light pipe. The diffuse window scatters the radiation from the lamp into a wide range of angles, and directs the scattered light into the diffuser light pipe which reflects incoming light multiple times as it propagates therethrough. These two elements combine to produce a well diffuse and uniform radiation pattern for illuminating the optical detector under test.

BRIEF DESCRIPTION OF THE DRAWINGS

The foregoing and other features and advantages of the present invention will become apparent from the following detailed description of a preferred embodiment thereof, taken in conjunction with the accompanying drawings in which.

DETAILED DESCRIPTION OF THE PREFERRED EMBODIMENT

Figure 1:
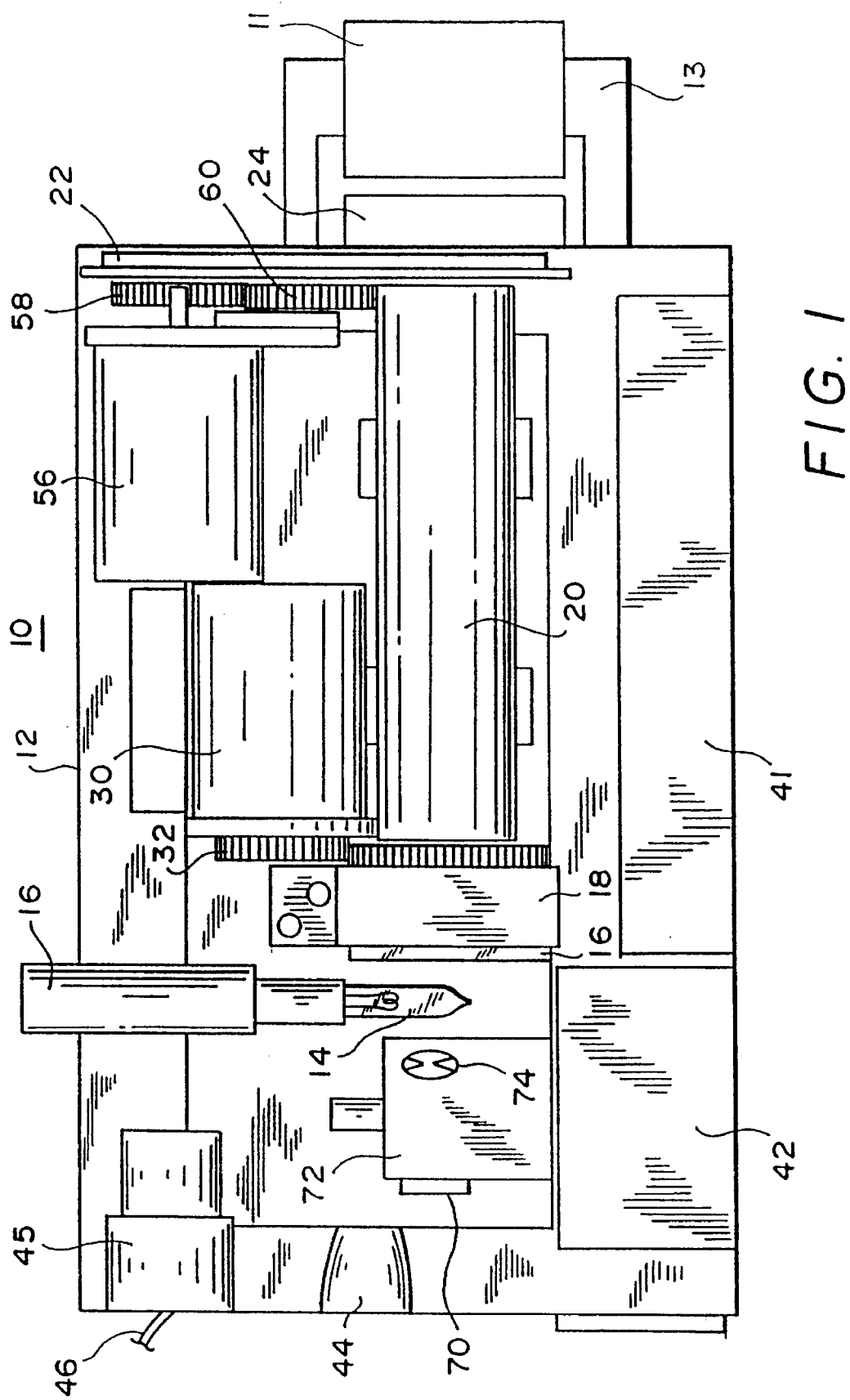
FIG. 1 is a schematic illustration of the mechanical structure of a calibration system constructed in accordance with the preferred embodiment of the invention.

Turning now to a more detailed consideration of a preferred embodiment of the present invention, FIG. 1 illustrates a calibration system 10 for calibrating and testing an optically responsive detector under test (DUT) 11. The system 10 includes a housing 12 which contains numerous elements for generating a controlled amount of optical radiation for testing any desired type of optical detector, such as for example, a hydrogen flame detector. A mounting bracket 13 is attached to the housing 12 for supporting the DUT 11.

Disposed in the housing 12, is a lamp 14 which is secured in a lamp holder 16. The lamp 14 is selected to emit radiation in a range of wavelengths which simulate the specific type of optical radiation to which the DUT 11 is responsive. For example, if the DUT 11 is a hydrogen flame detector, the lamp 14 preferably emits ultraviolet radiation in a spectral window of approximately 180 nm to 240 nm, which acts as a "signature" for a hydrogen fire since a hydrogen fire emits a small amount of radiation in this window, while other light sources, including incandescent lamps and the sun, do not emit radiation within this window. An example of a lamp which is suitable for this purpose is a krypton discharge lamp, such as is available from Hile Controls of Florida as Part No. 002405-002. It will of course be understood that the lamp 14 could be selected to emit other wavelength ranges in the optical spectrum from ultraviolet to infrared as desired, depending upon the type of optical detector to be tested.

Figure 2:
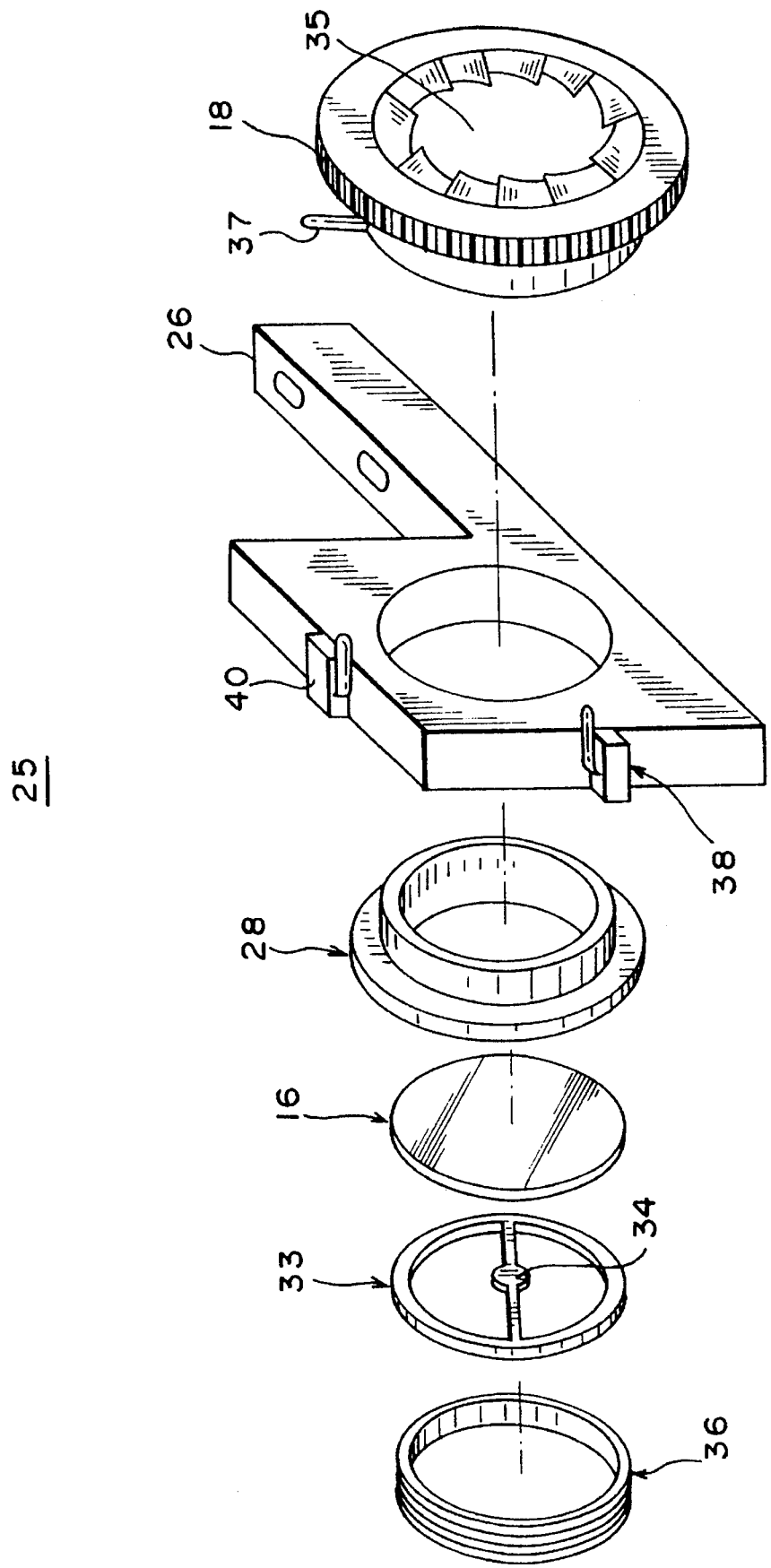
FIG. 2 is an exploded perspective illustration of an iris assembly employed in the structure of FIG. 1.

The radiation emitted by the lamp 14 is directed in sequence through a number of optical elements disposed within the housing 12. In order, these include a diffuser window 16, a geared iris 18, a diffuser light pipe 20, a multiple opening rotatable filter wheel 22 and an exit window 24 positioned closely adjacent (e.g., ⅛") the DUT 11. The diffuser window 16 and geared iris 18 are contained in a sub-assembly 25 as illustrated in FIG. 2. The diffuser window 16 is formed from a piece of transparent material that has been finely scratched by any suitable means, such as with a diamond wheel. Where the radiation spectrum of the lamp 14 is in the nonvisible region, the diffuser window 16 is preferably formed from a material such as sapphire, CaFl or quartz, for example. If the radiation spectrum of the lamp 14 is in the visible region, the diffuser window 16 is preferably made of glass. The purpose of the diffuser window 16 is to scatter the radiation from the lamp 14 into a wide range of angles. A metal support block 26 supports the diffuser window 16 in an optical holder 28, and also supports the geared iris 18.

The geared iris 18 is basically a conventional camera iris that is mounted in a gear which permits adjustment of the iris aperture size. This is preferably an off-the-shelf component which can be purchased, for example, from an optical supplier known as Melles Griot in Irvine, Calif. as Part No. 11. A stepper motor 30 is mounted in the housing 12 which selectively drives an output gear 32 that engages the geared iris 18 for adjusting the aperture size. The geared iris 18 forms a first means by which the intensity of the radiation emitted through the exit window 24 by the lamp 14 can be controlled.

Since conventional camera irises cannot completely close, but can only close down to a small opening through which substantial light can still pass, a small blocking member 33 is mounted in the optical holder 28 adjacent the diffuser window 16. The blocking member 33 is in the form of a 2 spoked ring having a centrally located disk 34 which prevents radiation emitted by the lamp 14 from passing through an aperture 35 of the geared iris 18 when the iris is in its maximum closure position. The blocking member 33 is preferably made from a black plastic material, such as black delrin, for example. The diffuser window 16 and blocking member 33 are secured in the holder 28 by means of a threaded retaining ring 36.

A pin 37 is attached to the rotating portion of the geared iris 18 which is positioned to engage and actuate first and second microswitches 38 and 40 that are mounted on the support block 26, and are employed to signal when the geared iris 18 is in either its most fully closed or most fully open position. The signals generated by the microswitches 38 and 40 are employed to prevent the stepper motor 30 from trying to advance the geared iris 18 beyond either of its two extreme positions.

The diffuser light pipe 20 is another conventional element which preferably consists of a length of stainless steel pipe that has been polished internally to reflect incoming light multiple times as it propagates toward the exit window 24. The combination of the diffuser light pipe 20 and the diffuser window 16 produces a well diffuse and uniform radiation pattern through the exit window 24 to insure that the DUT 11 will be uniformly illuminated, and that slight misalignments of the detector on its mounting will not adversely affect the test results.

Returning once again to FIG. 1, a number of other elements are illustrated for controlling operation of the system 10. These include a 5 volt DC power supply 41 which powers the various elements of the system 10, an Acopian power supply 42 for powering the DUT 11, a conventional RS-232 connector 43 for permitting serial communication between the system 10 and an external I/O device; an electrical connector 44 for connecting the system 10 to the DUT 11; and, a power entry module 45 which includes an on/off switch 46 for actuating the system 10, and also contains a filter and a fuse (not shown).

Figure 3:
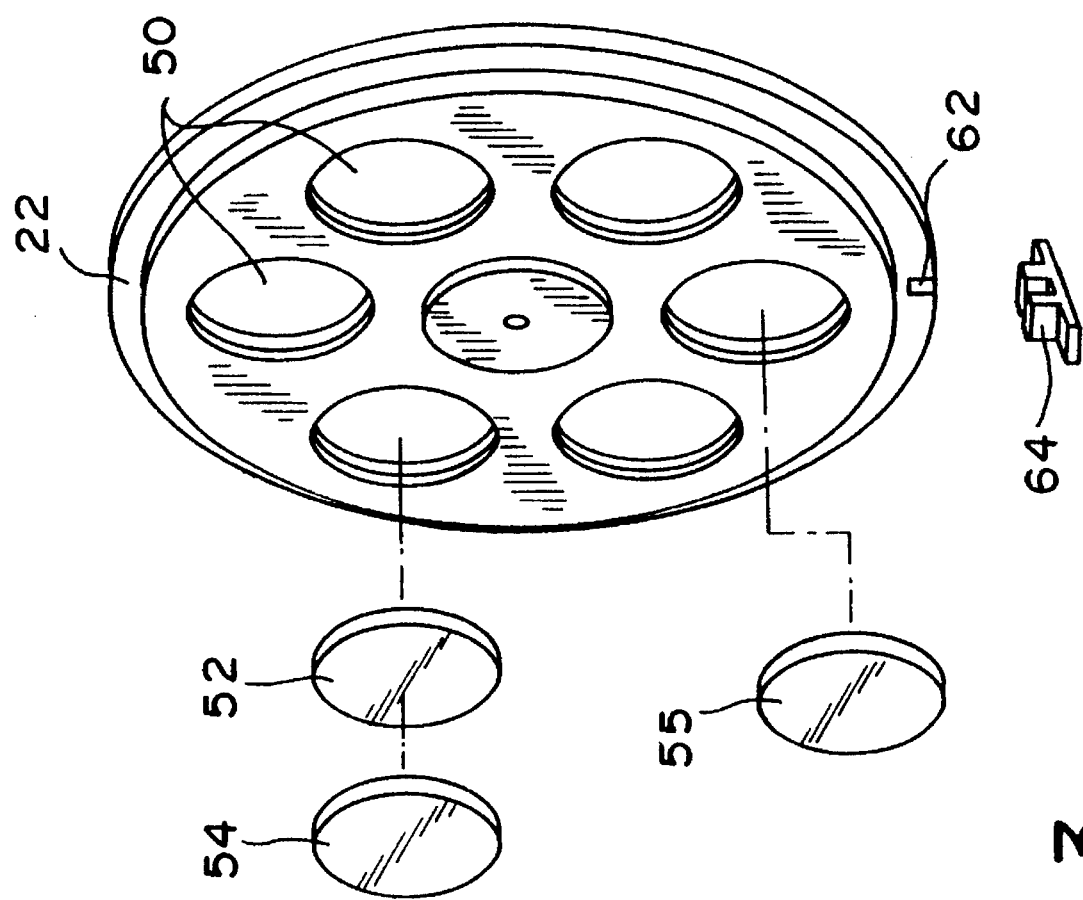
FIG. 3 is a perspective illustration of a filter wheel employed in the structure of FIG. 1.

As illustrated in FIG. 3, the multiple opening filter wheel 22 contains a plurality (e.g., 6) of equally spaced circular openings 50, in all but one of which are preferably mounted a band pass filter 52 and a neutral density filter 54. An opaque disk 55, preferably made of black delrin, is inserted in one of the openings 50, and is positioned in front of the light pipe 20 during lamp calibration as discussed in greater detail below. The key purposes of the filter wheel 22 are to provide a means to limit the spectral content of the radiation transmitted by the lamp 14, as well as to permit discrete control of the amount of transmitted radiation. The spectral content is regulated by the band pass filter 52, which can be a 240 nm band pass filter, for example, if the system 10 is being employed to test the operation of hydrogen fire detectors. The neutral density filters 54 are each selected to provide a different signal attenuation factor so that the geared iris 18 can be used in a position that provides finer control of the emitted radiation intensities for reasons to be discussed next.

Although the geared iris 18 is the primary element used to adjust the transmitted radiation intensity, and does so in a highly repeatable and stable manner, it suffers from a resolution problem. Each step of the stepper motor 30 moves the gear through a fixed angle. When the iris 18 is fully open, this angular step corresponds to a small fractional change in radius, and a correspondingly small aperture size and therefore intensity change. However, when the iris is almost shut, the small angular step corresponds to a large fractional radius change and correspondingly large aperture size and intensity changes which do not provide enough resolution. This becomes a problem, for example, when the system 10 is employed to simulate a hydrogen fire at a fairly long distance, for example 40 or more feet. To test a fire detector properly, the simulated detector distance must be increased only one or two feet at a time, however, when the iris is a few motor steps from full closure, each motor step may correspond to a change in the effective distance of 10 feet or more, for example. Thus, to provide the necessary resolution, the iris 18 should never be operated near its fully closed position. Therefore, the neutral density filters 54 are employed effectively as a course adjustment means for the emitted intensity so that the iris 18 can be operated in its most efficient range of positions, regardless of whether a relatively short or a very long source distance is being simulated.

To provide rotation of the filter wheel 22, a second stepper motor 56 selectively drives a gear 58, which in turn engages another gear 60 that is attached to the filter wheel 22. A slot 62 is formed near the edge of the filter wheel 22 which can be sensed by a conventional optical interrupter 64 when the filter wheel 22 is positioned so that the opaque disk 55 is in the path of radiation emitted by the diffuser light pipe 22. This is called the zero position of the filter wheel. The signal generated by the optical interrupter 64 is employed as a reference point to control operation of the stepper motor 56 for proper positioning of the wheel 22 in front of the light pipe 20.

To insure that the intensity of the radiation emitted by the lamp 14 remains stable over its lifetime, the lamp's intensity must be periodically sensed and the lamp's supply current adjusted accordingly to maintain the intensity constant. To achieve this calibration, a conventional optical detector element (e.g. photodetector) 70 is positioned in the housing 12 to receive radiation from the lamp 14. To insure that external radiation does not reach the detector 70, the filter wheel 22 is rotated to the zero position where the opaque disk 55 blocks the aperture of the light pipe 20 during the calibration procedure. A chopper head assembly 72 of any suitable construction is positioned between the lamp 14 and the optical detector 70 to permit selective exposure of the optical detector 70 to the lamp 14. By way of example, the chopper head assembly 72 can be a model 350 from Boston Electronics Corporation. The chopper head assembly 72 contains a two slot mini chopper blade 74 which is rotated, thereby alternatively allowing the detector 70 to "see" and then not "see" the lamp 14. This process "ac couples" the signal generated by the detector 70 in response to the lamp radiation from noise and other signals, such as dc signals and other ac interfering signals. The chopper head assembly 72 also provides an electrical timing signal that is employed by the microprocessor (discussed below in conjunction with FIG. 4) to determine when the detector 70 can see the lamp, and when it cannot. By subtracting the detector signal when it sees the lamp from the detector signal when it does not see the lamp and averaging these readings, the microprocessor can determine a stable measure of the lamp intensity which allows it to modify the lamp's current in order to maintain the lamp's intensity at a constant level. The microprocessor also varies the lamp current somewhat to provide different selected intensity levels, and this acts as a third means by which the emitted radiation intensity can be varied to simulate a radiation source at varying distances.

Figure 4:
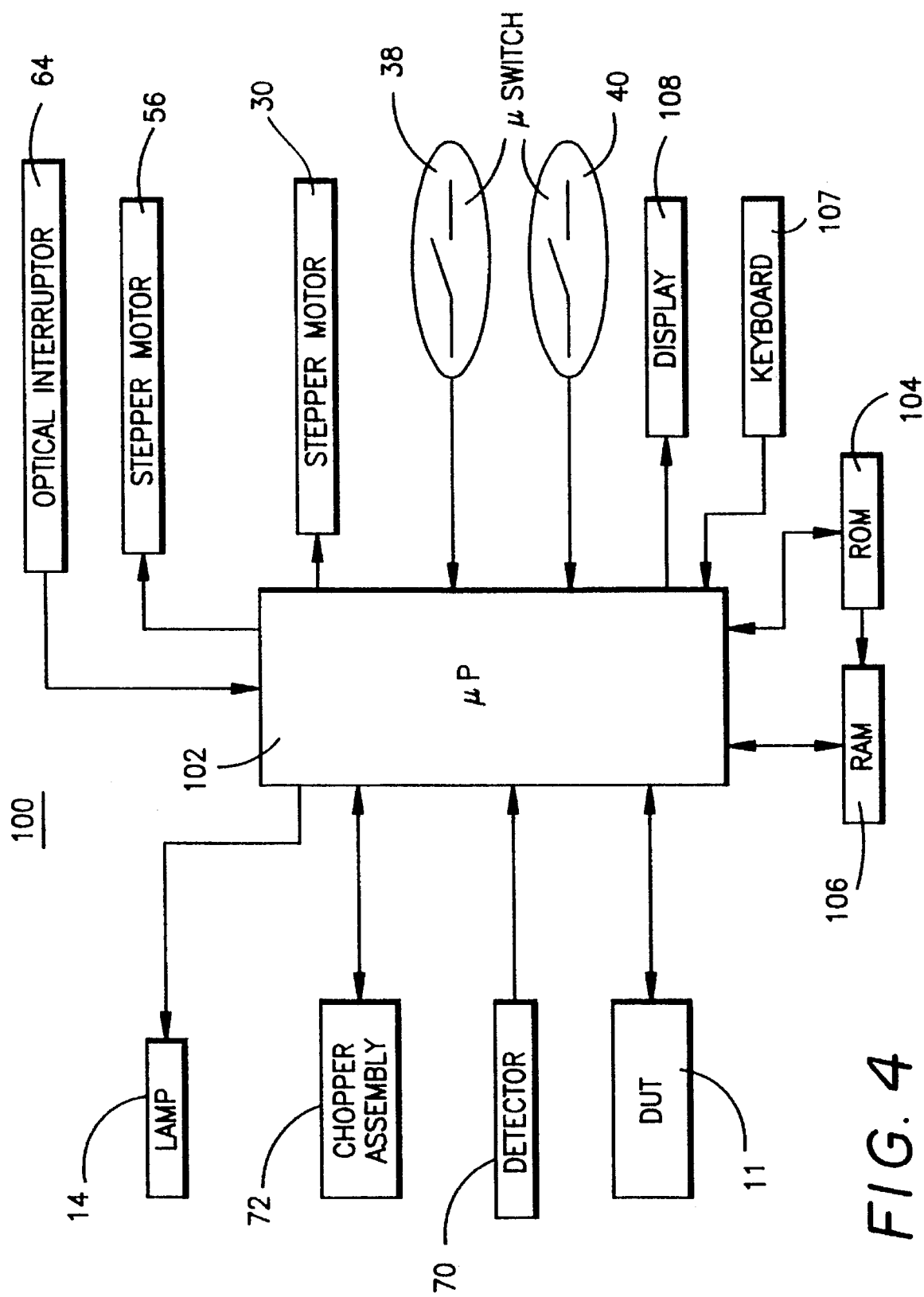
FIG. 4 is a general block diagram illustrating a microprocessor based circuit for controlling the system.

Turning now to FIG. 4, a microprocessor based control circuit 100 is illustrated which controls operation of the calibration system 10. The circuit 100 includes a microcontroller type microprocessor 102, which is preferably a Model 68HC11. The program which controls operation of the microprocessor 102 is contained in a ROM 104, and is loaded during operation into a RAM 106.

The microprocessor 102 receives inputs from the various analog elements, including the DUT 11, the two microswitches 38 and 40, the optical interrupter 64 for sensing the position of the filter wheel 22, and the photodetector 70 employed for calibrating the lamp 14. In addition, the operator enters various commands via a keyboard 107 connected to the microprocessor 102. In response to these inputs and the program stored in the RAM 106, the microprocessor 102 controls operation of the lamp 14, the two stepper motors 30 and 56, and the chopper assembly 72. In addition, the microprocessor 102 transmits various system messages to a conventional multi-character LCD display 108 that is mounted on an external surface (not shown) of the housing 12.

Figure 5:
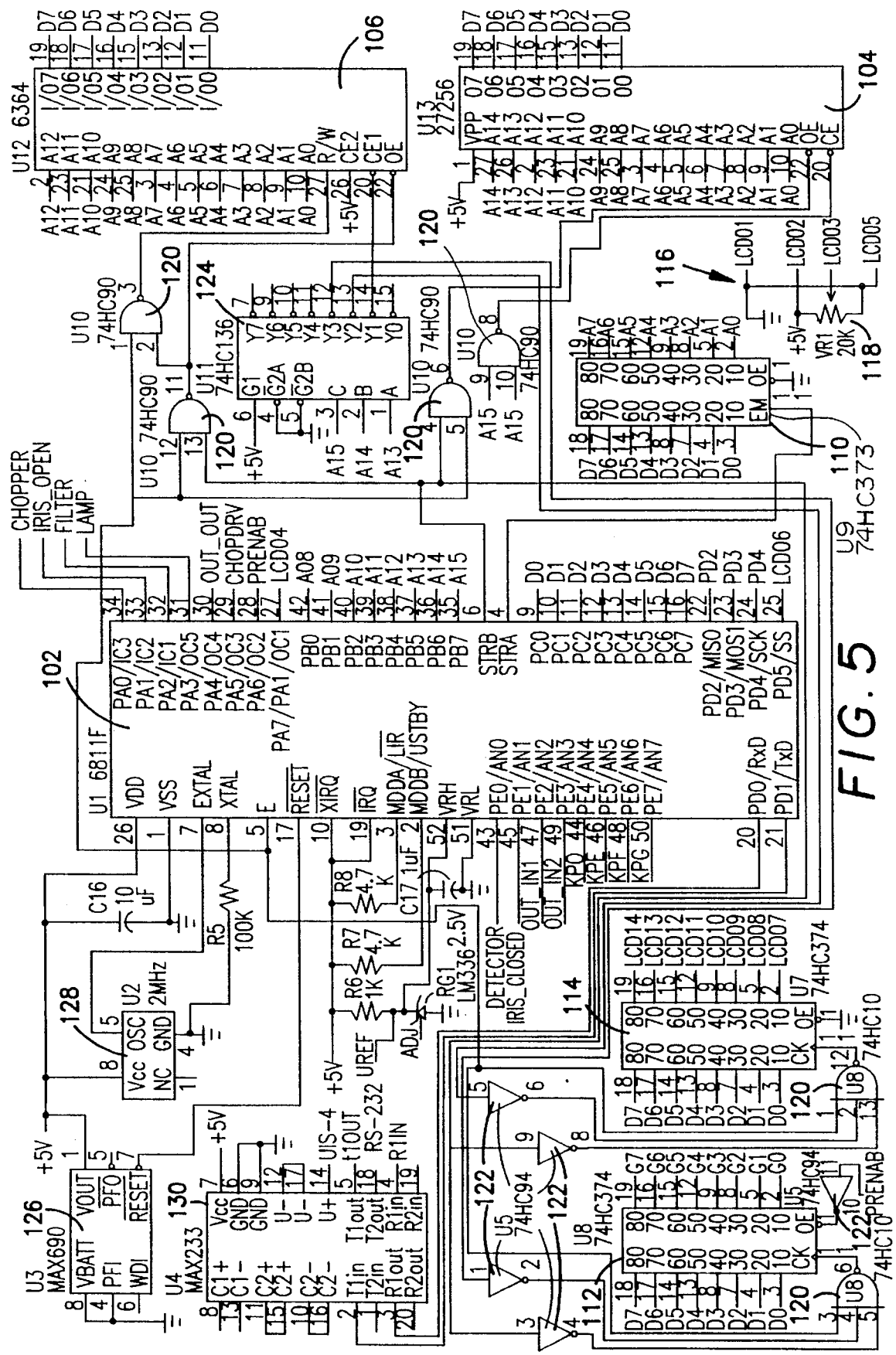
FIG. 5 is a detailed schematic circuit diagram illustrating the digital circuit elements which are employed in the system control circuit.
Figure 6:
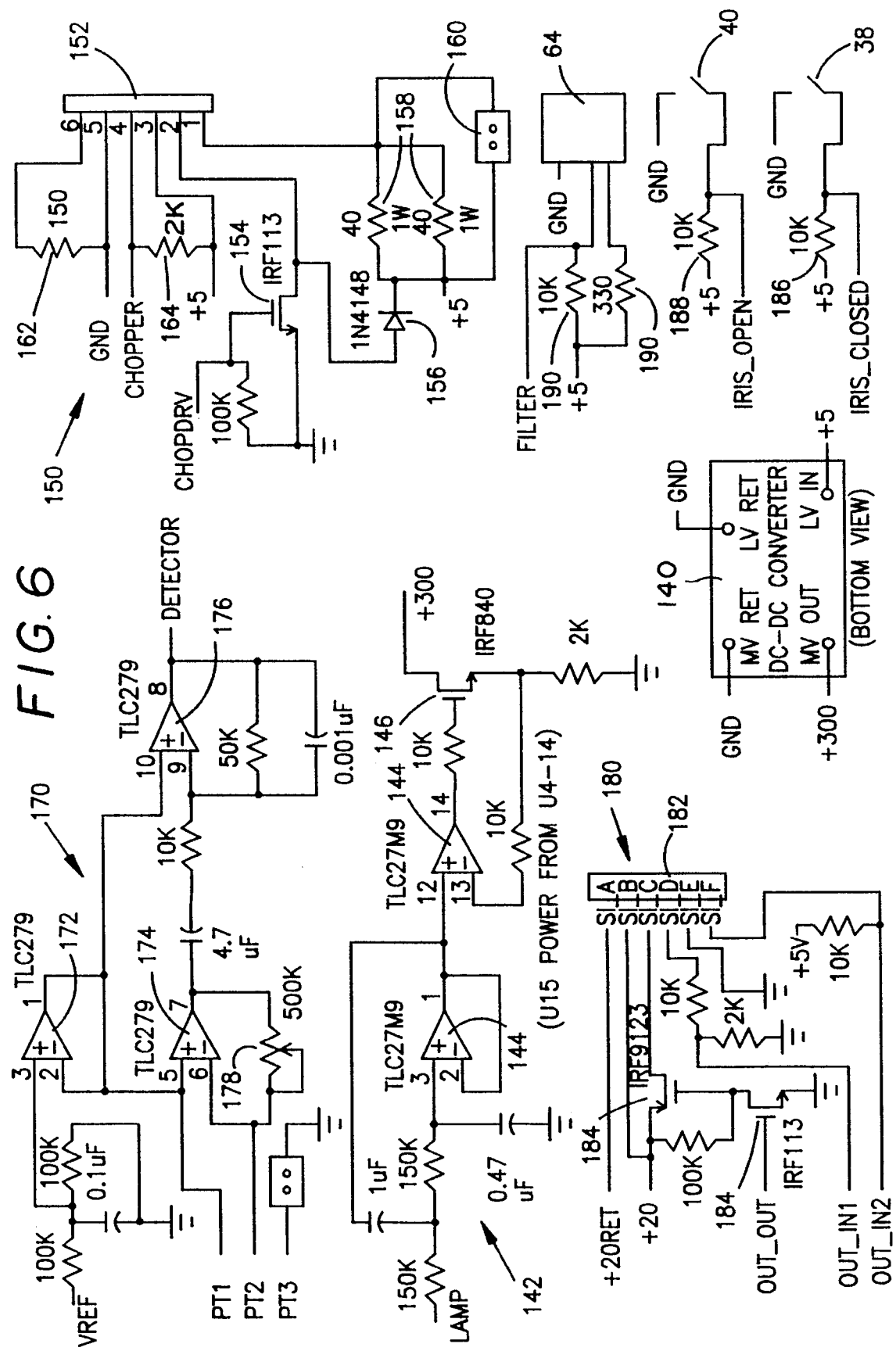
FIG. 6 is a detailed schematic circuit diagram of additional circuit elements which are employed in the system control circuit.

The details of the control circuit 100 are illustrated in FIGS. 5 and 6. With reference first to FIG. 5, the ROM 104 is preferably a 27256 EEPROM and supplies eight bits of program data on lines D0–D7 to the RAM 106, which is preferably a 6264 8KX8 general purpose static RAM. Addressing of the ROM 104 and RAM 106 is carried out through the PB and PC ports of the microprocessor 102. The PB ports (A8–A15) are connected directly to the ROM 104 and RAM 106, while the PC ports (D0–D7) are connected through a 74HC373 data latch 110 to the A0–A7 inputs of the ROM 104 and RAM 106.

The inputs from the microswitches 38 and 40, labelled IRIS_OPEN and IRIS_CLOSED, respectively, are connected to the PA1/IC2 and PE1/AN1 ports, respectively, of the microprocessor 102. The signal from the photodetector 70 is connected to the PE0/AN0 port, while the signal from the optical interrupter 64 for sensing the position of the filter wheel 22 is connected to the PA2/IC1 port. Signals received from the DUT 11, labelled DUT_IN1 and DUT_IN2 are received on the PE2/AN2 and PE3/AN3 ports, respectively.

The microprocessor 102 controls operation of the stepper motors 30 and 56 through the PC ports, D0–D7, and a first 74HC374 data latch 112. The data latch 112 sends the motor control signals to each of the stepper motors 30 and 56 through its output lines G0–G7. A second 74HC374 data latch 114 sends synchronized data from the PC ports to the LCD display 108. A contrast adjustment circuit 116, the heart of which is a trim pot 118, controls the voltage, and therefore intensity of the display 108.

The three data latches 110, 112 and 114 must be operated in accordance with clocking signals received from the microprocessor 102 to insure proper handling of the program data, motor control data and display data. For this purpose, the E, STRA and STRB ports of the microprocessor 102 are connected through a plurality of NAND gates 120 and inverter gates 122 to the various clock and enable inputs of the data latches 110, 112 and 114, as well as the ROM 104 and RAM 106. A 3:8 decoder 124 is also provided to permit selection of the data latches 112 and 114, and the RAM 106 through the A13–A15 PB ports.

A number of other conventional circuit elements are provided to support operation of the microprocessor 102. These include a MAX690 watchdog chip 126, an 8 Mhz oscillator 128 and a MAX233 chip 130 that is used to generate RS-232 signal voltages from pins 20 and 21 of the microprocessor 102 for serial communication with a remote device.

Turning now to FIG. 6, a 5 volt to 300 volt dc-dc converter 140 is employed to convert the 5 volt power supply voltage to the 300 volts necessary to power the lamp 14. The 300 volt output from the dc-dc converter 140 is connected to one terminal of the lamp 14, while the second terminal of the lamp 14 is connected to the output of a lamp control circuit generally indicated at 142. The lamp control circuit 142 includes a pair of op-amps 144, a MOSFET 146 and a number of associated resistors and capacitors which low pass filter the pulse width modulated LAMP output on pin 31 of the microprocessor 102, and employ this filtered voltage to control the current through the lamp 14.

A chopper control circuit 150 controls operation of the chopper assembly 72. The CHOPDRV signal coming from pin 29 of the microprocessor 102 is employed to turn the chopper wheel on by forcing pin 2 on a six pin chopper connector 152 to ground through a MOSFET 154. A protective diode 156 is connected between the number 2 and number 1 pins of the connector 152. A pair of isolation resistors 158 is provided which can be bypassed if desired through a jumper connector 160. The return signals from the chopper assembly 72 labelled CHOPPER and GND are output on pins 4 and 5, respectively, of the connector 152 with a pull-down resistor 162 being connected betweens 5 and 6, and a pull-up resistor 164 being connected between pins 4 and 3. The CHOPPER signal indicates the position of the chopper wheel, and is fed into the microprocessor 102 through pin 34.

A photodetector processing circuit 170 employs a plurality of op-amps 172, 174 and 176, and associated resistors and capacitors to convert three inputs labelled PT1, PT2 and PT3 from the photodetector 70 into an output signal labelled DETECTOR which is fed to a A/D input of the microprocessor 102 on pin 43 (see FIG. 5). The op-amps 172 and 174 provide a current to voltage conversion of the photodetector current, and a trim pot 178 is employed to set the gain on the current-voltage conversion. The third op-amp 176 acts as a bandpass filter which filters the signal before it is fed to the microprocessor 102 to enable it to determine the intensity of the lamp 14. The photodetector circuit 170 thus acts to ac-couple the photodetector signal relative to 1.25 volts, and filter out high frequency noise.

A detector connection circuit 180 is employed to connect the microprocessor 102 to the DUT 11. The preferred embodiment of the circuit was designed specifically to connect the system to a Scientific Instruments Fire Detector. Pins A and B of a six pin connector 182, carry power and ground, respectively, to the detector. The detector power is controlled by the microprocessor 102 through the DUT_OUT signal on pin 30 of the microprocessor 102 which switches power to the detector through a pair of MOSFETs 184. The DUT_1 signal on the D pin of the connector 182 is a digital signal which indicates whether the fire detector is in an alarm state or not, and is fed to the A/D input on pin 47 of the microprocessor 102. In the prototype of the invention, the A/D input is employed for this digital signal because all of the other digital inputs of the microprocessor are occupied. Finally, the DUT_IN2 is generated on the F pin of the connector 182, and is employed to indicate to the microprocessor 102 whether the fire detector is powered. This signal is connected to another of the A/D inputs on pin 49.

The first microswitch 38 is connected between 5 volts and ground through a pull up resistor 186, and supplies a grounded signal when it is closed on the return line labelled IRIS_CLOSED to pin 33 of the microprocessor 102 which indicates when the iris 18 is in its most fully closed position. Similarly, the second microswitch 40 is connected between 5 volts and ground through a pull up resistor 188, and provides a grounded signal when it is closed on the return line labelled IRIS_OPEN to pin 33 of the microprocessor 102 which provides an indication when the iris 18 is in its fully opened position. Finally, the optical interrupter 64 is connected between 5 volts and ground through a pair of pull up resistors 190, and provides a signal on the return line labelled FILTER to pin 32 of the microprocessor 102 when the optical interrupter 64 detects the slot 62 in the filter wheel 22, thereby indicating that the filter wheel 22 is in the zero position with the opaque disk 55 blocking the exit window 24.

Figure 7:
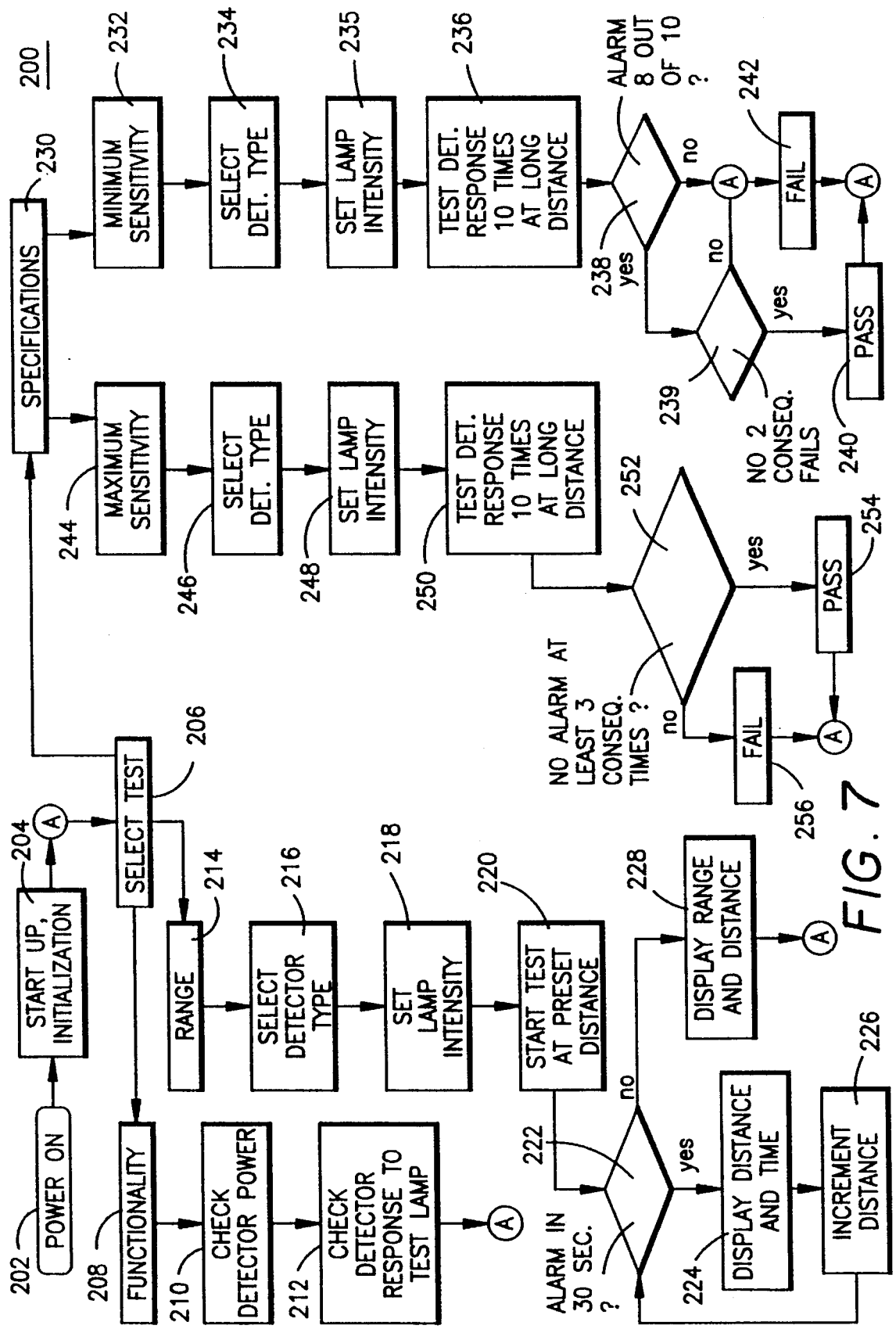
FIG. 7 is a flow chart illustrating the operation of the system.

The operation of the system 10 will next be discussed in conjunction with the flow chart 200 illustrated in FIG. 7. First, the DUT 11 is mounted on the bracket 13 directly in front of the exit window 24, and is then electrically connected to the circuitry with its associated connector. The system is then switched on at step 202 with the on/off switch 46, and the system program begins an initialization routine and start up procedures at step 204. During this time, the position of the filter wheel 22 is reset to its zero position, the aperture in the geared iris 18 is reset and the speed of the chopper wheel in the chopper assembly 72 is stabilized. Various messages are displayed on the display 108 as the various start up steps are accomplished.

Once the system is up and running, the operator begins testing the detector at step 206 by selecting one of three types of tests. The first type indicated at step 208 is a functionality test which checks the basic operability of the DUT 11. At step 210, the system first checks a confidence relay in the DUT 11, and indicates on the display 108 that the relay is working by displaying that the unit has power. Next, at step 212, the system turns on a test lamp within the fire detector to check the selftest alarm relay. If the detector is healthy, the system will display that the detector responded properly to the test lamp.

Next, the actual detector calibration tests begin. First, the operator selects the range test at step 214, and is requested to enter the detector type at step 216. The prototype of the preferred embodiment was designed specifically for testing three types of hydrogen fire detectors referred to as a (−1), (−2) and (−3). A (−2) unit is a standard, unmodified detector which is designed to alarm off of a standard hydrogen fire (defined as the fire resulting from burning $H_2$ flowing at 5 SLPM through a 1/16 in. orifice) at a distance of 24 feet or less. A (−1) unit is an (−2) unit modified with an added screen mesh to reduce sensitivity to the point where the unit will alarm off of a standard hydrogen fire at 15 feet or less. A (−3) unit is a (−2) unit which has modified electronics that increase the sensitivity so that it will alarm at a distance of 54 feet or less.

After the appropriate detector type is entered, the microprocessor sets the lamp 14 to a predetermined intensity at step 218 using the previously discussed lamp calibration procedure. This takes approximately 1 minute. After the lamp is set, the range testing begins at step 220 by testing the detector with an ultraviolet intensity equivalent to that produced by a standard hydrogen fire located a predetermined distance in feet from the detector.

At step 222, the microprocessor determines if the detector alarms within 30 seconds. If so, the simulated distance and alarm time are displayed at step 224, and then the simulated distance is incremented at step 226 by a set amount, e.g. 1 foot, and the test is repeated. The simulated distance is incremented primarily by actuating the stepper motor 30 to decrease the aperture size of the iris 18. Once the aperture size is reduced to a predetermined value, the filter wheel 22 is rotated to place a neutral density filter with a greater signal attenuation factor in front of the exit window 24. This permits the iris 18 to be opened back up to a more suitable aperture size. In addition, the current to the lamp 14 can be modified to provide a further means for fine adjustment of the simulated distance. Whether the lamp current is increased or decreased, and by how much, is a function of the calibration process and depends on fine details of the lamp orientation and construction. Lamp current modification is desirable because the difference in attenuation between successive ones of the neutral density filters 54 varies by an order of magnitude, however, to achieve a simulated range increment of one or two feet when the simulated range is already fairly long, e.g. 40 feet or more, a very small incremental change in emitted radiation intensity must be made. Variation of the lamp current helps provide this fine adjustment capability.

Once the distance has been increased where the detector no longer alarms within 30 seconds, the program goes to step 228 which displays the maximum detector range to be the greatest distance which caused the detector to alarm within 30 seconds. This completes the range test.

The final test indicated at step 230 is known as specifications testing which actually comprises two subtests for minimum and maximum sensitivity. At step 232, a minimum sensitivity test is initiated by the operator first entering the fire detector type as before at step 234. After the microprocessor sets the lamp intensity at step 235, the microprocessor measures the time it takes the detector to respond at a fixed short distance, and repeats this test 10 times (step 236). At step 238, the microprocessor determines if the detector has alarmed at least 8 out of the 10 times, and if so, checks that no two consecutive failures have occurred at step 239. If it passes both of these tests, the detector is determined to have passed the minimum sensitivity test at step 240. If not, the detector is determined to have failed the test at step 242. By way of example, a response time of 5 seconds has been chosen with a (−1) detector distance of 15 feet, a (−2) distance of 24 feet and a (−3) detector distance of 45 feet.

Next, the maximum sensitivity test is initiated at step 244, and the detector type is once again entered at step 246. The maximum sensitivity test serves to insure that the detector will not generate false alarms. After the lamp intensity is set at step 248 to a relatively long simulated distance that should not cause the detector to alarm within 5 seconds, 10 consecutive tests of the detector are conducted at step 250. After the tests are completed, the microprocessor determines at step 252 if the detector failed to alarm at least three times consecutively out of the 10 trials. If so, the detector is determined to have passed the test at step 254, and if not, the detector is determined to have failed the test at step 256. This completes the various test procedures for the detector.

In summary, the present invention provides a system for calibrating and testing various types of optically responsive detectors which is convenient and easy to use, and can accurately determine a detector's effective range and sensitivity by simulating a source of radiation to which the detector is responsive at varying simulated distances.

Although the present invention has been disclosed in terms of a preferred embodiment, it will be understood that numerous modifications and variations could be made thereto without departing from the spirit and scope of the invention as defined by the following claims.

What is claimed is:

1. An apparatus for testing and calibrating optically responsive detectors comprising:

a) a housing;

b) a light source contained in said housing for emitting optical radiation in a range of wavelengths to which an optically responsive detector to be calibrated is responsive;

c) a power supply selectively connectable to said light source for supplying current thereto;

d) an aperture in said housing for transmitting said radiation emitted by said light source toward said optically responsive detector to be calibrated that is positioned externally of said housing;

e) a first adjustable optical element disposed in said housing between said light source and said aperture for controllably varying the intensity of said radiation emitted from said housing by said light source;

f) a first motor disposed in said housing for adjusting said first optical element;

g) a microprocessor disposed in said housing for controlling operation of said light source and said first motor, said microprocessor also being connectable to said optically responsive detector to be calibrated for controlling operation of the detector and receiving signals from the detector indicative of its operational condition;

h) an input device connected to said microprocessor for entering commands and data into said microprocessor;

i) an output device connected to said microprocessor for outputting test information and other data; and j) a memory device connected to said microprocessor for storing a program for controlling operation of said apparatus.

2. The apparatus of claim 1, wherein said first adjustable optical element comprises an iris having an iris aperture which is adjustable between a first, minimum size and a second, maximum size by said first motor.

3. The apparatus of claim 2, further comprising an opaque disk supported between said light source and said iris, said opaque disk being sized and positioned to prevent said radiation from said light source from passing through said iris when its aperture is adjusted to said first, minimum size.

4. The apparatus of claim 2, further comprising:
k) a second adjustable optical element disposed in said housing between said first adjustable optical element and said housing aperture for controllably varying the intensity of said radiation emitted from said housing by said light source; and
l) a second motor controlled by said microprocessor for adjusting said second optical element.

5. The apparatus of claim 4, wherein said second adjustable optical element comprises a rotatable filter wheel containing a plurality of spaced wheel apertures which are selectively positionable between said light source and said housing aperture, and having at least one of which contains an optical radiation intensity attenuating filter element.

6. The apparatus of claim 5, further comprising a wavelength selective optical filter is also positioned in each of at least one of said plurality of wheel apertures.

7. The apparatus of claim 5, further comprising an opaque element is positioned in one of said plurality of wheel apertures, and means are provided for sensing when said opaque element is positioned between said light source and said housing aperture, and providing an indication of such position to said microprocessor.

8. The apparatus of claim 7, further comprising:
m) a photodetector disposed in said housing and connected to said microprocessor for sensing the intensity of said radiation emitted by said light source; and
n) means in said microprocessor responsive to signals received from said photodetector for controlling the current supplied to said light source, and thereby controlling the intensity of said radiation emitted by said light source.

9. The apparatus of claim 8, further comprising an optical chopper assembly disposed in said housing between said light source and said photodetector, and connected to said microprocessor, for periodically exposing said photodetector to said radiation emitted from said light source; and
means for causing said microprocessor to subtract an electrical signal generated by said photodetector when it is not exposed to said radiation emitted from said light source, from an electrical signal generated by said photodetector when it is exposed to said radiation emitted from said light source in order to determine the intensity of the light source's radiation accurately.

10. The apparatus of claim 5, further comprising light diffuser means positioned between said iris and said filter wheel.

11. The apparatus of claim 2, further comprising light diffuser means disposed between said iris and said housing aperture.

12. The apparatus of claim 2, further comprising means for sensing when said iris is adjusted to its minimum or maximum aperture sizes, and providing a control signal to said microprocessor for controlling operation of said first motor.

13. The apparatus of claim 1, further comprising:
k) a photodetector disposed in said housing and connected to said microprocessor for sensing the intensity of said radiation emitted by said light source; and
l) means in said microprocessor responsive to signals received from said photodetector for controlling the current supplied to said light source, and thereby controlling the intensity of said radiation emitted by said light source.

14. The apparatus of claim 13, further comprising an optical chopper assembly disposed in said housing between said light source and said photodetector, and connected to said microprocessor, for periodically exposing said photodetector to said radiation emitted from said light source; and
means for causing said microprocessor to subtract an electrical signal generated by said photodetector when it is not exposed to said radiation emitted from said light source, from an electrical signal generated by said photodetector when it is exposed to said radiation emitted from said light source in order to determine the intensity of the light source's radiation accurately.

15. A method for calibrating an optically responsive detector comprising the steps of:
a) providing a device for emitting optical radiation in a range of wavelengths to which an optically responsive detector to be calibrated is responsive, said device being provided with means for adjusting the intensity of the emitted radiation to simulate a radiation source at varying distances from said optically responsive detector to be calibrated;
b) positioning said optically responsive detector to be calibrated adjacent said device in a position so that said optically responsive detector will receive said radiation emitted by said device;
c) causing said device to emit said optical radiation toward said detector of an intensity level which simulates said radiation source at a predetermined simulated distance from said detector;
d) determining whether said detector responds to said emitted radiation within a predetermined period of time;
e) if said detector responds to said emitted radiation within said predetermined period of time, then decreasing the intensity of the emitted radiation by an incremental amount to a new intensity level to simulate an incremental increase in the simulated distance between said radiation source and the detector;
f) repeating steps d) and e) at each new intensity level until said detector no longer responds within said predetermined period of time; and
g) providing an indication of the maximum simulated distance to which said detector responds within said predetermined period of time.

16. The method of claim 15, further comprising the steps of:
h) testing the maximum sensitivity of said detector by causing said device to emit radiation of an intensity level to which said detector should not respond within said predetermined period of time;
i) determining if said detector responds to said radiation within said predetermined period of time;
j) repeating steps h) and i) a plurality of times;
k) determining if said detector does not respond to said radiation at least a plurality of consecutive times; and
l) providing an indication that said detector passes the maximum sensitivity test if it does not alarm at least said plurality of consecutive times, and otherwise, providing an indication that said detector fails said maximum sensitivity test.

17. The method of claim 16, further comprising the steps of:
m) testing the minimum sensitivity of said detector by causing said device to emit radiation of an intensity corresponding to a simulated distance to which said detector should respond within said predetermined period of time;

n) determining if said detector responds to said radiation within said predetermined period of time;

o) repeating steps m) and n) a plurality of times;

p) determining if said detector responds within said predetermined period of time at least a predetermined number of said plurality of times;

q) determining if said detector does not fail to respond two consecutive times of said plurality of times; and if so, r) providing an indication that said detector passed said minimum sensitivity test; and if not, providing an indication that said detector failed said minimum sensitivity test.

18. The method of claim 15, wherein said step of providing a device further comprises the steps of:

i) providing a light source for emitting optical radiation in a range of wavelengths to which said optically responsive detector to be calibrated is responsive;

ii) providing a power supply for selectively powering said light source;

iii) providing a motor driven iris disposed between said light source and said optically responsive detector to be calibrated, said motor driven iris having an aperture which is adjustable between a first, minimum size and a second, maximum size for varying the intensity of radiation passing through said aperture;

iv) providing a motor driven filter wheel containing a plurality of spaced wheel apertures which are selectively positionable between said light source and said optically responsive detector to be calibrated, at least one of said apertures containing an optical radiation intensity attenuating filter element; and v) providing a microprocessor for controlling operation of said light source, said motor driven iris and said motor driven filter wheel to selectively control the intensity of said radiation received by said optically responsive detector from said light source.

19. The method of claim 18, wherein the step of decreasing the intensity of the emitted radiation by said incremental amount to said new intensity level further comprises the step of causing said microprocessor to adjust the current supplied to said light source, the aperture size of said motor driven iris and the position of said motor driven filter wheel as necessary to obtain an incremental decrease in the intensity of the emitted radiation received by said optically responsive detector from said light source.

20. A method for calibrating an optically responsive detector comprising the steps of:

a) providing a device for emitting optical radiation in a range of wavelengths to which an optically responsive detector to be calibrated is responsive, said device including:

i) a housing;

ii) a light source contained in said housing for emitting said optical radiation in said range of wavelengths to which said optically responsive detector to be calibrated is responsive;

iii) a power supply selectively connectable to said light source for supplying current thereto;

iv) an aperture in said housing for transmitting said radiation emitted by said light source toward said optically responsive detector to be calibrated that is positioned externally of said housing;

v) a motor driven iris disposed in said housing between said light source and said aperture having an iris aperture which is adjustable between a first, minimum size and a second, maximum size for controllably varying the intensity of said radiation emitted from said housing by said light source;

vi) a motor driven rotatable filter wheel disposed in said housing between said motor driven iris in said housing aperture, said filter wheel containing a plurality of spaced wheel apertures which are selectively positionable between said light source and said housing aperture, and having at least one of which contains an optical radiation intensity attenuating filter element;

vii) a microprocessor disposed in said housing for controlling operation of said light source, said motor driven iris and said motor driven rotatable filter wheel;

viii) an input device connected to said microprocessor for entering commands and data into said microprocessor;

ix) an output device connected to said microprocessor for outputting test information and other data; and x) a memory device connected to said microprocessor for storing a program for controlling operation of said device;

b) positioning said optically responsive detector to be calibrated adjacent said housing aperture so that said optically responsive detector will receive radiation emitted by said light source; and c) causing said microprocessor to adjust any combination of said current, said motor driven iris and said motor driven rotatable filter wheel as necessary to cause said device to emit said optical radiation from said housing aperture toward said detector of an intensity level which simulates a radiation source at a predetermined simulated distance from said detector.

21. The method of claim 20, further comprising the steps of:

d) determining whether said detector responds to said emitted radiation within a predetermined period of time;

e) if said detector responds to said emitted radiation within said predetermined period of time, then decreasing the intensity of the emitted radiation by an incremental amount to a new intensity level to simulate an incremental increase in the simulated distance between said radiation source and the detector;

f) repeating steps d) and e) at each new intensity level until said detector no longer responds within said predetermined period of time; and g) displaying on said output device the maximum simulated distance to which said detector responds within said predetermined period of time.

22. The method of claim 21, wherein said step of decreasing the intensity of the emitted radiation by said incremental amount further comprises the step of causing said microprocessor to adjust said current, said motor driven iris and said rotatable filter wheel as necessary to attain said new intensity level.

23. The method of claim 20, further comprising the steps of:

d) testing the maximum sensitivity of said detector by causing said device to emit radiation of an intensity level to which said detector should not respond within a predetermined period of time;

e) determining if said detector responds to said radiation within said predetermined period of time;

f) repeating steps d) and e) a plurality of times;

g) determining if said detector does not respond to said radiation at least a plurality of consecutive times; and h) providing an indication on said output device that said detector passes the maximum sensitivity test if it does not alarm at least said plurality of consecutive times, and otherwise, providing an indication that said detector failed said maximum sensitivity test.

24. The method of claim 20, further comprising the steps of:

d) testing the minimum sensitivity of said detector by causing said device to emit radiation of an intensity corresponding to a simulated distance to which said detector should respond within a predetermined period of time;

e) determining if said detector responds to said radiation within said predetermined period of time;

f) repeating steps d) and e) a plurality of times;

g) determining if said detector responds within said predetermined period of time at least a predetermined number of said plurality of times;

h) determining if said detector does not fail to respond two consecutive times of said plurality of times; and if so, i) providing an indication on said output device that said detector passed said minimum sensitivity test; and if not, providing an indication on said output device that said detector failed said minimum sensitivity test.

* * * * *